United States Patent [19]

Mitamura et al.

[11] Patent Number: 4,963,310

[45] Date of Patent: Oct. 16, 1990

[54] PROCESS FOR PRODUCTION OF POLYESTER POLYURETHANE ELASTOMERIC FIBERS

[75] Inventors: Hideyuki Mitamura; Yoshikazu Arimatsu; Katsuya Tani, all of Ohtsu; Kenichi Katsuo, Tsuruga, all of Japan

[73] Assignee: Toyo Boseki Kabushiki Kaisha, Osaka, Japan

[21] Appl. No.: 267,663

[22] Filed: Nov. 4, 1988

Related U.S. Application Data

[63] Continuation of Ser. No. 10,043, Feb. 2, 1987, abandoned.

[30] Foreign Application Priority Data

Feb. 4, 1986 [JP] Japan ................................. 61-22446

[51] Int. Cl.$^5$ ................................................ D01F 6/00
[52] U.S. Cl. ............................... 264/205; 264/211.14; 264/211.17; 264/236; 264/347; 528/26; 528/28; 528/38
[58] Field of Search ........................... 528/26, 28, 38; 264/211, 205, 209.6, 211.14, 331.19, 211.17, 236, 347

[56] References Cited

U.S. PATENT DOCUMENTS

4,508,889 4/1985 Noren et al. ........................ 528/28
4,631,329 12/1986 Gornowicz et al. ................. 528/28

FOREIGN PATENT DOCUMENTS

4940006 10/1974 Japan .................................. 264/205

*Primary Examiner*—John C. Bleutge
*Assistant Examiner*—Ralph Dean, Jr.

[57] ABSTRACT

A process for the production of polyester polyurethane elastomeric fibers having improved humid aging resistance which comprises the steps of reacting a polyester diol with an excess molar amount of an organic diisocyanate to prepare a urethane prepolymer having terminal isocyanate group at both ends thereof; extending the chain of the prepolymer with a bifunctional active hydrogen compound and 0.5 to 10.0 mole % of a diaminosilyl compound based on the total amount of the bifunctional active hydrogen compound during or after preparation of the prepolymer to obtain a polyurethane; spinning the polyurethane into fiber; and crosslinking the polyurethane during or after spinning.

6 Claims, No Drawings

PROCESS FOR PRODUCTION OF POLYESTER POLYURETHANE ELASTOMERIC FIBERS

This application is a continuation of application Ser. No. 07/010,043, filed Feb. 2, 1987, now abandoned.

FIELD OF THE INVENTION

The present invention relates to a process for the production of polyester polyurethane elastomeric fibers. More particularly, it relates to a process for the production of polyester polyurethane elastomeric fibers which have improved humid aging resistance such that, even if they are allowed to stand for a long period of time in the presence of moisture, their properties are not substantially impaired.

BACKGROUND OF THE INVENTION

In order to improve humid aging resistance of polyester polyurethane elastomeric fibers, various attempts have been hitherto made. For example, it is known to use polylactone polyester diols or polycarbonate polyester diols, to use hydrophobic polyester diols having low ester linkage density, or to crosslink the polymer terminals of polyurethanes.

However, in the polyester polyurethane elastomeric fibers obtained by these known techniques, not only does production cost become higher, but also improvement of humid aging resistance is still insufficient. Further, elastic recovery of the fibers is often lowered. Thus, no satisfactory process for the production of polyester polyurethane elastomeric fibers having sufficiently improved humid aging resistance can be found yet in this field.

On the other hand, in the field of urethane elastomers and paint, an attempt to improve adhesion and water resistance has been made by using a silyl compound as an ingredient of a curable adhesive polyurethane (see Japanese Patent Kokai No. 57-211118). However, according to this technique, it is not possible to obtain normal fibers by spinning because crosslinkage occurs prior to spinning.

Further, it has been proposed to introduce crosslinkage into polyurethanes to improve elastic recovery and heat resistance (see Japanese Patent Kokai No. 58-163727). However, according to this technique, spinning is not possible because of gel formation prior to spinning.

OBJECTS OF THE INVENTION

The present inventors have studied intensively to solve problems in the above known techniques and to improve humid aging resistance of polyester polyurethane elastomeric fibers. As the result, it has been found that polyester polyurethane elastomeric fibers having sufficiently improved humid aging resistance can be obtained without adverse effect on spinning, high production cost and lowering of elastic recovery by using a diaminosilyl compound together with a bifunctional active hydrogen compound as a chain extender to introduce the silyl groups into a polyurethane formed, and crosslinking the silyl groups introduced in the polymer during or after spinning.

That is, the main object of the present invention is to provide a process for the production of polyester polyurethane elastomeric fibers having sufficiently improved humid aging resistance without the problems of the above known techniques.

This object as well as other objects and advantages of the present invention will become apparent to those skilled in the art from the following description.

SUMMARY OF THE INVENTION

According to the present invention, there is provided a process for the production of polyester polyurethane elastomeric fibers which comprises the steps of:

reacting a polyester diol with an excess molar amount of an organic diisocyanate to prepare a urethane prepolymer having terminal isocyanate groups at both ends thereof, extending the chain of the prepolymer with a bifunctional active hydrogen compound and 0.5 to 10.0 mole % of a diaminosilyl compound based on the total amount of the bifunctional active hydrogen compound during or after preparation of the prepolymer to obtain a polyurethane, spinning the polyurethane into fibers, and crosslinking the polyurethane during or after spinning.

By using the diaminosilyl compound in the chain extension reaction and crosslinking during or after spinning, the process of the present invention can impart sufficiently improved humid aging resistance to the polyester polyurethane elastomeric fibers obtained without impairing their excellent properties and characteristics.

DETAILED EXPLANATION OF THE INVENTION

In the process of the present invention, the polyester polyurethane elastomeric fibers are obtained by reacting a polyester diol having a molecular weight of 600–8,000, preferably, 1,000–6,000 and a melting point of not more than 60° C. with an excess molar amount of an organic diisocyanate to prepare a urethane prepolymer having terminal isocyanate groups at both ends thereof, extending the chain of the prepolymer with a bifunctional active hydrogen compound and 0.5 to 10.0 mole %, preferably 2.0–6.0 mole %, of a diaminosilyl compound based on the total amount of the bifunctional active hydrogen compound during or after preparation of the prepolymer to obtain a polyurethane, spinning the polyurethane into fiber, and crosslinking the polyurethane during or after spinning.

Examples of the polyester diol include polyester glycols composed of one or more glycols such as ethylene glycol, 1,4-butanediol, neopentyl glycol, 1,6-hexanediol, etc., and one or more dicarboxylic acids such as adipic acid, suberic acid, azelaic acid, sebacic acid, $\beta$-methyladipic acid, isophthalic acid, etc.: polycaprolactone glycol, and polyhexamethylene dicarbonate glycol. They can be used alone, or they can be used in combination or in the form of a copolymer thereof. As the diols, ethylene glycol, 1,4-butanediol and neopentyl glycol are preferred and, as the dicarboxylic acid, adipic acid is preferred.

As the organic diisocyanate, there can be used, for example, 4,4'-diphenylmethane diisocyanate, 1,5-naphthalene diisocyanate, 1,4-phenylene diisocyanate, 2,4-tolylene diisocyanate, hexamethylene diisocyanate, 1,4-cyclohexane diisocyanate, 4,4,'-dicyclohexylmethane diisocyanate, isophorone diisocyanate and the like. They can be used alone or in combination thereof. 4,4'-Diphenylmethane diisocyanate is preferred.

The organic diisocyanate is used in an excess molar amount. That is, the molar ratio of the polyester diol :

the organic diisocyanate is 1 : 1.3-1 : 3.5, preferably, 1 : 1.5-1 : 3.0.

Examples of the bifunctional active hydrogen compound include ethylenediamine, 1,2-propylenediamine, hexamethylenediamine, xylylenediamine, 4,4′-diphenylmethanediamine, hydrazine, 1,4-diaminopiperazine, ethylene glycol, 1,4-butanediol, 1,6-hexanediol, water and the like. They can be used alone or in combination thereof. Particularly, diamines are preferred.

The preparation of the prepolymer and the polyurethane can be carried out according to a conventional method.

For example, 1.5-3.0 moles of the organic diisocyanate is reacted with 1 mole of the polymer diol in the presence, or in the absence, of a solvent, to obtain the urethane prepolymer having isocyanate groups at both terminals. As the solvent, there can be used N,N-dimethylformamide, N,N-dimethylacetamide, tetramethylurea, hexamethylphosphonamide and the like. Optionally, a catalyst for accelerating the reaction such as tertiary amines, tin compounds, etc., or an acidic negative catalyst can be used in this reaction.

Then, if necessary, a solvent such as above, is added to the reaction mixture of the prepolymer, and chain extension reaction is carried out in a solution state with the bifunctional active hydrogen compound to obtain a solution of the desired polyurethane. Optionally, the chain extended polymer solution can be terminated with a monofunctional active hydrogen compound, etc. according to a conventional method.

In the present invention, the method for preparation of the prepolymer and the polyester polyurethane per se is not critical except using the diaminosilyl compound, and the polymer diol, the organic diisocyanate and the bifunctional active hydrogen compound may be reacted simultaneously, or they may be separately reacted in several steps.

The diaminosilyl compound used in the present invention is, preferably, a compound of the formula:

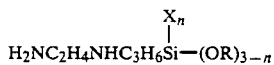

wherein X is alkyl having 1-4 carbon atoms: R is alkyl having 1-4 carbon atoms: and n is 0 or 1. This compound is commercially available, or can be prepared by a known process such as that disclosed in U.S. Pat. No. 2,971,864. The preferred diaminosilyl compound is N-(β- aminoethyl)-γ- aminopropyltrimethoxysilane.

The diaminosilyl compound is used in an amount of 0.5-10.0 mole %, preferably, 2.0-6.0 mole %, based on the total amount of the bifunctional active hydrogen compound used as the chain extender. When the amount of the diaminosilyl compound is lower than 0.5 mole %, desired crosslinking is not expected and it is difficult to improve humid aging resistance. On the other hand, when the amount of diaminosilyl compound is higher than 10.0 mole %, stability of the resulting polymer solution is impaired, which causes a problem in operation. In the present invention, the diaminosilyl compound can be added to a reaction mixture together with, or in the form of a mixture with the bifunctional active hydrogen compound used as the chain extender from the beginning of the chain extension reaction. Or it can be added during or at the end of the chain extension reaction. Preferably, the chain extension reaction is carried out at 0-40° C. for 5-120 min.

In the present invention, additives such as antioxidants, U.V. absorbers, pigments such as titanium oxide and other conventional additives (e.g., hindered amines, tertiary amine compounds, bacteriostats, mildewproofing agents, etc.) can be added to the polyurethane. However, in order to enhance stability of the polymer solution, it is preferred to maintain the pH thereof at about neutral.

The solution of the polyester polyurethane thus prepared, which usually contains 20-40 % by weight of the polyester polyurethane, is spun into fibers according to a conventional spinning technique. Spinning is not limited to a specific type, but dry spinning is preferred.

The fibers can be subjected to false twisting and an oil agent can be provided thereto. The oil agent is not limited to a specific one, but it is preferred to use a conventional oil agent such as polydimethylsiloxane, an oil agent containing polydimethylsiloxane as a main ingredient as well as a liquid organopolysiloxane obtained by replacing a part of methyl group of polymethylsiloxane with another alkyl group or phenyl, or a modified polysiloxane obtained by introducing epoxy group, amino group, vinyl group, etc.: or a mineral oil. Particularly, in the case of the polyurethane wherein a polyester diol is used as the soft segment thereof, a straight oil mainly composed of an organopolysiloxane is preferred.

The crosslinking in the present invention is to increase viscosity of the polymer or to insolubilize the polymer in a solvent after spinning. The crosslinking can be effected at a pH of 2-9, for example, by heating at 100-150° C. for 1 to 60 min., optionally, in the presence of a catalyst such as acetic acid, formic acid, sodium carbonate, etc. to crosslink alkoxy groups in the silyl units introduced in the polyurethane elastomeric fibers. The crosslinking can be also effected at a pH of 2-9 by allowing the fibers to stand at 60° C. or higher for at least 30 min. Usually, no specific separate crosslinking step is needed because crosslinking can be attained at a temperature employed during spinning, or it can be attained by heating in an after treatment step such as a scouring or dyeing step.

According to the present invention, when the polyester polyurethane elastomeric fibers obtained are brought into contact with water and heated in an after treatment step, alkoxy groups of the diaminosilyl compound introduced in the urethane molecule are hydrolyzed and converted into silanol groups. The silanol groups form siloxane bonds with each other by dehydration condensation due to further heating or a catalytic action to form a network structure. It is considered that, by this crosslinking, humidity resistance of the elastomeric fibers obtained is improved, which results in improvement of humid aging resistance of the fibers.

The viscosity of the solution of the polyester polyurethane obtained according to the process of the present invention is stable and does not substantially vary even with the passage of time. Further, the resulting polyester polyurethane elastomeric fibers have set resistance in addition to excellent humid aging resistance and excellent elastic recovery.

The following examples and comparative examples further illustrate the present invention in detail but are not to be construed to limit the scope thereof. In the examples and comparative examples, all "parts" are by weight unless otherwise stated.

Evaluation of humid aging resistance, set resistance and elastic recovery in the examples and comparative examples were carried out as follows.

(1) Humid aging resistance

A sample of elastomeric fibers was allowed to stand under the circumstances of 70° C. and 95 % RH for 2 weeks. Tenacity and polymer viscosity were determined before and after standing.

(a) Tenacity: breaking tenacity (g) measured under the conditions of a fiber length of 5 cm and a stress rate of 50 cm/min.

$$\text{Tenacity retention rate (\%)} = \frac{S}{S_0} \times 100$$

wherein $S_0$ is tenacity (g) before standing: and $S$ is tenacity (g) after standing.

(b) Polymer viscosity ($\eta_{inh}$)

$$\eta_{inh} = \ln \eta_r / C$$

$$\text{wherein } \eta_r = \frac{\text{viscosity of solution}}{\text{viscosity of solvent}};$$

C is 0.3 g/100 ml of DMAc: and DMAc is dimethylacetamide.

Viscosity was measured at 30° C.

(2) Set resistance $$\text{Set resistance rate (\%)} = \left[\frac{l_2 - l_0}{l_0}\right] \times 100$$

wherein $l_0$ is the original fiber length (cm); $l_1$ is the fiber length at 100 % elongation (cm): and $l_2$ is the fiber length at 30 min. standing after heat setting. Heat setting was carried out by treating the fibers at 180° C. (dry heat) for 1 min.

(3) Elastic recovery

Stretching up to 300 % elongation at stress rate of 50 cm/min. was repeated three times (the original fiber length: 5 cm) and elastic recovery was evaluated as reverting stress (g) at 150 % elongation at the third time.

EXAMPLE 1

Dimethylacetamide (6,000 parts) was added to a mixture of a polyester diol having terminal hydroxy groups at both ends (molecular weight: 4,000: molar ratio of adipic acid : ethylene glycol : 1,4-butanediol = 1.00 : 0.56 : 0.49) (13,037 parts) and 4,4'-diphenylmethane diisocyanate (2,037 parts), and prepolymer reaction was carried out at 50° C. for 35 min. Then, dimethylacetamide (15,000 parts) was added to the reaction mixture to dilute the prepolymer solution. The solution was cooled to 10° C.

1,2-Propylene diamine (316 parts) and N-($\beta$- aminoethyl) -$\gamma$- aminopropyltrimethoxysilane (29 parts) were dissolved in dimethylacetamide (4,584 parts) to prepare a diamine solution. The diamine solution was added to the above prepolymer solution over 90 min. to effect chain extension. Diethylamine (55 parts) dissolved in dimethylacetamide (730 parts) was added to the reaction mixture to effect termination. Further, an antioxidant and additional dimethylacetamide were added to obtain a 30 % polyurethane solution having the viscosity of 1,800 P. at 30° C.

According to a conventional dry spinning (spinneret hole diameter: 0.15 mm$\phi$, 7 holes, hot air temperature: 225° C., rate of spinning: 400 m/min.), the resulting polyurethane solution was spun into fibers to obtain polyurethane elastomeric fibers of 55 D.

Humid aging resistance of the resulting elastomeric fibers was evaluated. Further, after subjecting the fibers to scouring and then boiling water treatment in an acidic bath at pH 3, heat setting was effected, and set resistance and elastic recovery were evaluated. The results of the evaluation are shown in Table 1 hereinafter.

EXAMPLES 2-3 AND COMPARATIVE EXAMPLES 1-2

Polyurethane elastomeric fibers of 55 D were obtained according to the same manner as described in Example 1 except that the molar ratio of 1,2-propylene diamine and N-($\beta$- aminoethyl) -$\gamma$- aminopropyltrimethoxysilane of the diamine solution was changed as shown in Table 1. (In Comparative Example 2, the polyurethane solution could not be spun.) Likewise, humid aging resistance, set are shown in Table 1.

COMPARATIVE EXAMPLES 3-5

Polyurethane elastomeric fibers of 55 D were obtained according to the same manner as described in Example 1. However, in Comparative Example 3, no diaminosilyl compound was added to the chain extender. In Comparative Example 4, termination of end was carried out by using $\gamma$- ammopropyltriethoxysilane instead of diethylamine. In Comparative Example 5, polyester diol having the molar ratio of adipic acid : 1,6-hexanediol : neopentyl glycol = 1.0 : 0.75 : 0.3 (molecular weight: 4,000) was used and no diaminosilyl compound was added to the chain extender. Likewise, humid aging resistance, set resistance and elastic recovery were evaluated. The results are shown in Table 1.

TABLE 1

| Ex. No. | PDA/silyl* compound (mole %) | Tenacity Before standing (g) | Tenacity After standing (g) | Retention rate (%) | Polymer viscosity (dl/g) Before standing | Polymer viscosity (dl/g) After standing |
|---|---|---|---|---|---|---|
| Ex. 1 | 97/3 | 53.9 | 48.5 | 90 | 1.02 | insol. |
| Comp. Ex. 1 | 99.75/0.25 | 55.6 | 17.2 | 31 | 1.02 | 0.46 |
| Ex. 2 | 99/1 | 54.9 | 43.9 | 80 | 1.01 | 1.25 |
| Ex. 3 | 93/7 | 53.5 | 45.5 | 85 | 1.03 | insol. |
| Comp.** Ex. 2 | 88/12 | — | — | — | — | — |
| Comp. Ex. 3 | 100/0 | 55.4 | 17.2 | 31 | 0.99 | 0.45 |
| Comp. Ex. 4 | 100/0*** | 53.7 | 16.6 | 31 | 1.01 | 0.47 |
| Comp. Ex. 5 | 100/0 | 54.2 | 19.0 | 35 | 0.98 | 0.50 |

| Ex. No. | Set resistance (%) | Elastic recovery reverting stress (g) Before standing | Elastic recovery reverting stress (g) After standing |
|---|---|---|---|
| Ex. 1 | 55 | 1.0 | 1.0 |
| Comp. Ex. 1 | 70 | 1.0 | 0.6 |
| Ex. 2 | 61 | not determined | |

TABLE 1-continued

| | | | |
|---|---|---|---|
| Ex. 3 | 58 | | not determined |
| Comp.* Ex. 2 | — | — | — |
| Comp. Ex. 3 | 71 | 1.0 | 0.5 |
| Comp. Ex. 4 | 70 | | not determined |
| Comp. Ex. 5 | 69 | | not determined |

*PDA: 1,2-propylene diamine Silyl compound: N-(β-aminopropyl-γ-aminopropyl-trimethoxysilane aminopropyl-trimethoxysilane
**Impossible to spin
***Termination with γ- aminopropyltrimethoxysilane
*Impossible to spin As seen from Table 1, the polyester polyurethane elastomeric fibers obtained according to the process of the present invention have excellent humid aging resistance and set resistance. On the other hand, in fibers obtained without using the silyl compound, or terminated with another silyl compound, improvement of humid aging resistance is not expected. Further, when using the silyl compound in an amount outside of the range of the present invention, or using a polyester diol having high hydrolytic resistance without the silyl compound, improvement of humid aging resistance is not expected, either.

What is claimed is:

1. A process for the production of polyester polyurethane elastomeric fibers which comprises the steps of:
   reacting a polyester diol with an excess molar amount of an organic diisocyanate to prepare a urethane prepolymer having terminal isocyanate groups at both ends thereof,
   extending the chain of the prepolymer with a bifunctional active hydrogen compound and 0 5 to 10.0 mole % of a diaminosilyl compound based on the total amount of the bifunctional active hydrogen compound during or after preparation of the prepolymer to obtain a polyurethane,
   spinning the polyurethane into fiber, and
   crosslinking the polyurethane during or after spinning.

2. A process according to claim 1 wherein the diaminosilyl compound is that of the formula:

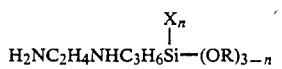

wherein X is alkyl having 1–4 carbon atoms; R is alkyl having 1–4 carbon atoms; and n is 0 or 1.

3. A process according to claim 1, wherein the polyester diol has a molecular weight of 600–8,000 and a melting point of not more than 60° C.

4. A process according to claim 1, wherein the diaminosilyl compound is N-(β- aminoethyl) -γ- aminopropyltrimethoxysilane.

5. A process according to claim 1 wherein said bifunctional active hydrogen compound is selected from the group consisting of diamines and glycols.

6. A process according to claim 4 wherein the bifunctional active hydrogen compound is 1,2-propylene diamine.

UNITED STATES PATENT AND TRADEMARK OFFICE
CERTIFICATE OF CORRECTION

PATENT NO. : 4,963,310

DATED : October 16, 1990

INVENTOR(S) : HIDEYUKI MITAMURA ET AL.

It is certified that error appears in the above-identified patent and that said Letters Patent is hereby corrected as shown below:

Claim 1 (column 8, line 4), "0 5" should be --0.5--.

Signed and Sealed this

Twenty-fourth Day of December, 1991

Attest:

HARRY F. MANBECK, JR.

*Attesting Officer*  *Commissioner of Patents and Trademarks*